US012257597B2

(12) United States Patent
Kendrick et al.

(10) Patent No.: US 12,257,597 B2
(45) Date of Patent: Mar. 25, 2025

(54) DECORATING ROLLERS

(71) Applicant: Coral Tools Limited, Leeds (GB)

(72) Inventors: Rob Kendrick, Nottinghamshire (GB); Matthew Page, Essex (GB)

(73) Assignee: Coral Tools Limited, Leeds (GB)

( * ) Notice: Subject to any disclaimer, the term of this patent is extended or adjusted under 35 U.S.C. 154(b) by 268 days.

(21) Appl. No.: 17/913,017

(22) PCT Filed: Mar. 12, 2021

(86) PCT No.: PCT/GB2021/050624
§ 371 (c)(1),
(2) Date: Sep. 20, 2022

(87) PCT Pub. No.: WO2021/186152
PCT Pub. Date: Sep. 23, 2021

(65) Prior Publication Data
US 2023/0142318 A1 May 11, 2023

(30) Foreign Application Priority Data
Mar. 20, 2020 (GB) ...................................... 2004070

(51) Int. Cl.
*B05C 17/02* (2006.01)

(52) U.S. Cl.
CPC ................................ *B05C 17/0217* (2013.01)

(58) Field of Classification Search
CPC ............................ B05C 17/02; B05C 17/0217
See application file for complete search history.

(56) References Cited

U.S. PATENT DOCUMENTS 3,906,581 A 9/1975 Marino et al.
6,510,579 B1 1/2003 Gartner
(Continued)

FOREIGN PATENT DOCUMENTS

EP 0672463 B1 * 4/1999 ............. B05C 17/02
EP 1022064 A2 * 7/2000 ............. B05C 17/02
(Continued)

OTHER PUBLICATIONS

Combined Search and Examination Report from the Great Britain Intellectual Property Office for Application No. GB2004070.5, mailed on Mar. 21, 2022, a counterpart foreign application of U.S. Appl. No. 17/913,017, 6 pgs.
(Continued)

*Primary Examiner* — Randall E Chin
(74) *Attorney, Agent, or Firm* — Lee & Hayes, P.C.

(57) ABSTRACT

A retention assembly for a hollow tubular decorating roller comprising a fixed mount member that is securable in use to a roller frame. The fixed mount member includes a first primary support formation and a first retention formation that extends radially beyond the first primary support formation. The retention assembly also includes a separable mount member that is selectively couplable with the fixed mount member. The separable mount member includes a second primary support formation and a second retention formation that extends radially beyond the second primary support formation. The first and second primary support formations are received, in use, by a respective end of a hollow tubular decorating roller. The first and second retention formations cooperate with one another while the separable mount member is coupled with the fixed mount member to in use retain a hollow tubular decorating roller therebetween.

19 Claims, 5 Drawing Sheets

(56) References Cited

U.S. PATENT DOCUMENTS

| | | | |
|---|---|---|---|
| 2014/0026343 | A1 | 1/2014 | Perreault |
| 2017/0326582 | A1 | 11/2017 | Page |

FOREIGN PATENT DOCUMENTS

| | | | |
|---|---|---|---|
| GB | 2522126 | A | 7/2015 |
| JP | 2002301421 | | 10/2002 |

OTHER PUBLICATIONS

PCT Search Report for corresponding PCT Application No. PCT/GB2021/050624 dated Jun. 14, 2021, 3 pages.

* cited by examiner

DECORATING ROLLERS

This Application is a U.S. National Stage application under 35 U.S.C. § 371 of PCT Application No. PCT/GB2021/050624, filed 12 Mar. 2021, which claims priority to GB Application 2004070.5, filed 20 Mar. 2020, which is incorporated herein by reference.

This invention relates to a retention assembly for a hollow tubular decorating roller and to a decorating roller assembly.

It is known to use a hollow tubular decorating roller to apply paint to a surface, for example a wall. Typically, the hollow tubular decorating roller is rotatably secured to a roller frame to permit use of the hollow tubular decorating roller to apply paint.

According to a first aspect of the invention there is provided a retention assembly for a hollow tubular decorating roller comprising:

- a fixed mount member securable in use to a roller frame and including a first primary support formation and a first retention formation extending radially beyond the first primary support formation; and
- a separable mount member selectively couplable with the fixed mount member, the separable mount member including a second primary support formation and a second retention formation extending radially beyond the second primary support formation, the first and second primary support formations being received, in use, by a respective end of a hollow tubular decorating roller, the first and second retention formations cooperating with one another while the separable mount member is coupled with the fixed mount member to in use retain a hollow tubular decorating roller therebetween
- wherein each of the first and second primary support formations includes a respective mutually engageable attachment formation, one of the mutually engageable attachment formations is a receivable attachment formation and the other one of the mutually engageable attachment formations is an insertable attachment formation, the receivable attachment formation includes an opening and the insertable attachment formation incudes an inserting portion for inserting into the opening of the receivable attachment formation,
- the insertable attachment formation further including a locking member configured to cooperate with the receivable attachment formation when the inserting portion is inserted into the opening to couple the receivable and insertable attachment formations to one another, wherein the locking member includes first and second locking member portions protruding from the insertable attachment formation and being spaced from one another to locate a portion of the receivable attachment formation therebetween.

Having each of the first and second retention formations extend radially beyond a respective first or second primary support formation provides a means of retaining a hollow tubular decorating roller between the separable and fixed mount members. As such, the risk of the hollow tubular decorating roller working its way off of the fixed and separable mount members during painting is much reduced. Meanwhile, selectively coupling the separable mount member with the fixed mount member permits ready replacement of a hollow tubular decorating roller, for example, for maintenance or cleaning purposes.

The inclusion first and second locking member portions as defined above permits coupling of the receivable and insertable attachment formations to one another which not only prevents separation of the attachment formations from one another, but also prevents oscillating, i.e. bending and/or twisting, movement of the fixed and separable mount members relative to one another when the assembly is being used. Such movement might otherwise cause the fixed and separable mount members to separate unexpectedly.

The retention assembly is therefore capable of holding a hollow tubular decorating roller in a desired position during painting, while permitting ready removal of the hollow tubular decorating roller from the retention assembly as required.

Optionally the first and second locking member portions each take the form of a barb portion, each barb portion having a tapered end and a non-tapered end.

Such an arrangement reliably prevents separation of the mutually engageable attachment formations. The barb portion is also not susceptible to becoming dislodged by relative rotational movement of the separable and fixed mount members, e.g. as may occur when painting, and so the mutually engageable attachment formations are less likely to become unintentionally detached from one another.

The non-tapered ends of each barb portion preferably face one another.

Such an arrangement means that the tall end of each barb portion, e.g. the end which protrudes the most from the inserting portion, forms the sides of the gap created by the barb portions being spaced apart from one another. Thus, the portion of the receivable attachment formation that is located between the barb portions is locked between the sides defined by the tall end of the barb portions.

In a preferred embodiment of the invention, the first and second locking portions locate at either side of the opening of the receivable attachment formation.

As such, an existing part of the receivable attachment formation is used to locate between the locking member portions so as to hold the components in place.

Optionally at least one of the mutually engageable attachment formations is or includes a resiliently deformable attachment formation.

Providing a resiliently deformable attachment formation allows ready attachment and detachment of the mutually engageable attachment formation while maintaining secure and robust attachment functionality.

In one embodiment of the invention, the receivable attachment formation includes first and second slots formed on an outer face of the corresponding mutually engageable attachment formation, and further includes first and second stop portions formed within the receivable attachment formation, and

- wherein the insertable attachment formation includes first and second resiliently deformable attachment legs each having first and second locking member portions spaced from one another, the first and second attachment legs being configured to deform, in use, towards one another to selectively permit entry and exit of the legs into and out of a respective slot, and wherein the first and second locking member portions of each first and second attachment legs are configured to locate a corresponding stop portion between the first and second locking member portions to resist separation of the mutually engageable attachment formations.

One of the mutually engageable attachment formations may be elongate so as to extend, in use, along the length of a hollow tubular decorating roller.

One of the mutually engageable attachment formations being elongate aids in the attachment of the mutually engageable attachment formations to one another since the mutually engageable attachment formation being received by a hollow tubular decorating roller is visible at one end of the roller.

At least one of the first and second retention formations may include a plurality of discrete projection portions.

A plurality of discrete projection portions provides a means for retaining a hollow tubular decorating roller between the separable and fixed mount members while reducing the weight and material cost of the retention assembly.

Preferably at least one of the first and second retention formations includes a single projection portion extending fully around the corresponding primary support formation.

Such an arrangement provides the retention functionality of the first and/or second retention formation while also simplifying fabrication of the retention assembly.

Optionally the fixed mount member includes a roller frame fixedly secured thereto.

The fixed mount member may be rotatably secured to the roller frame. Moreover, the separable mount member may rotatably receive the roller frame such that, when the separable mount member is coupled to the fixed mount member, the separable mount member is also rotatably secured to the roller frame.

Such an arrangement allows rotational movement of a hollow tubular decorating roller relative to the roller frame in use.

The separable mount member may include a guide portion to guide the position of the roller frame relative to the separable mount member.

The inclusion of such a guide portion aids in the positioning of the separable mount member relative to the roller frame. For example, the guide portion may help to centralise a portion of the roller frame within the separable mount member. This is particularly useful when the separable mount member has been received by a hollow tubular decorating roller such that the second primary support formation is at least partially obscured from view.

At least one of the fixed and separable mount members may include a secondary support formation to in use support an interior of a hollow tubular decorating roller.

Such a secondary support formation abuts in use an interior surface of a hollow tubular decorating roller so as to help prevent the hollow tubular decorating roller deforming during use, thereby providing better painting performance.

The secondary support formation may extend along a length of the hollow tubular decorating roller so as to prevent deformation along the whole length thereof.

According to a second aspect of the invention there is provided a decorating roller assembly comprising:

- a retention assembly as described hereinabove; and
- a hollow tubular decorating roller within respective ends of which is received a corresponding first or second primary support formation of the retention assembly.

The decorating roller assembly shares the advantages set out above in relation to the retention assembly of the first aspect of the invention.

Optionally each of the first and second retention formations extends radially beyond an internal cavity of the hollow tubular decorating roller.

Such an arrangement holds the hollow tubular decorating roller in position relative to the retention assembly, and so the risk of the hollow tubular decorating roller working its way off of the retention assembly during painting is reduced.

There now follows a brief description of preferred embodiments of the invention, by way of non-limiting example, with reference being made to the following drawings in which.

Figure 1:
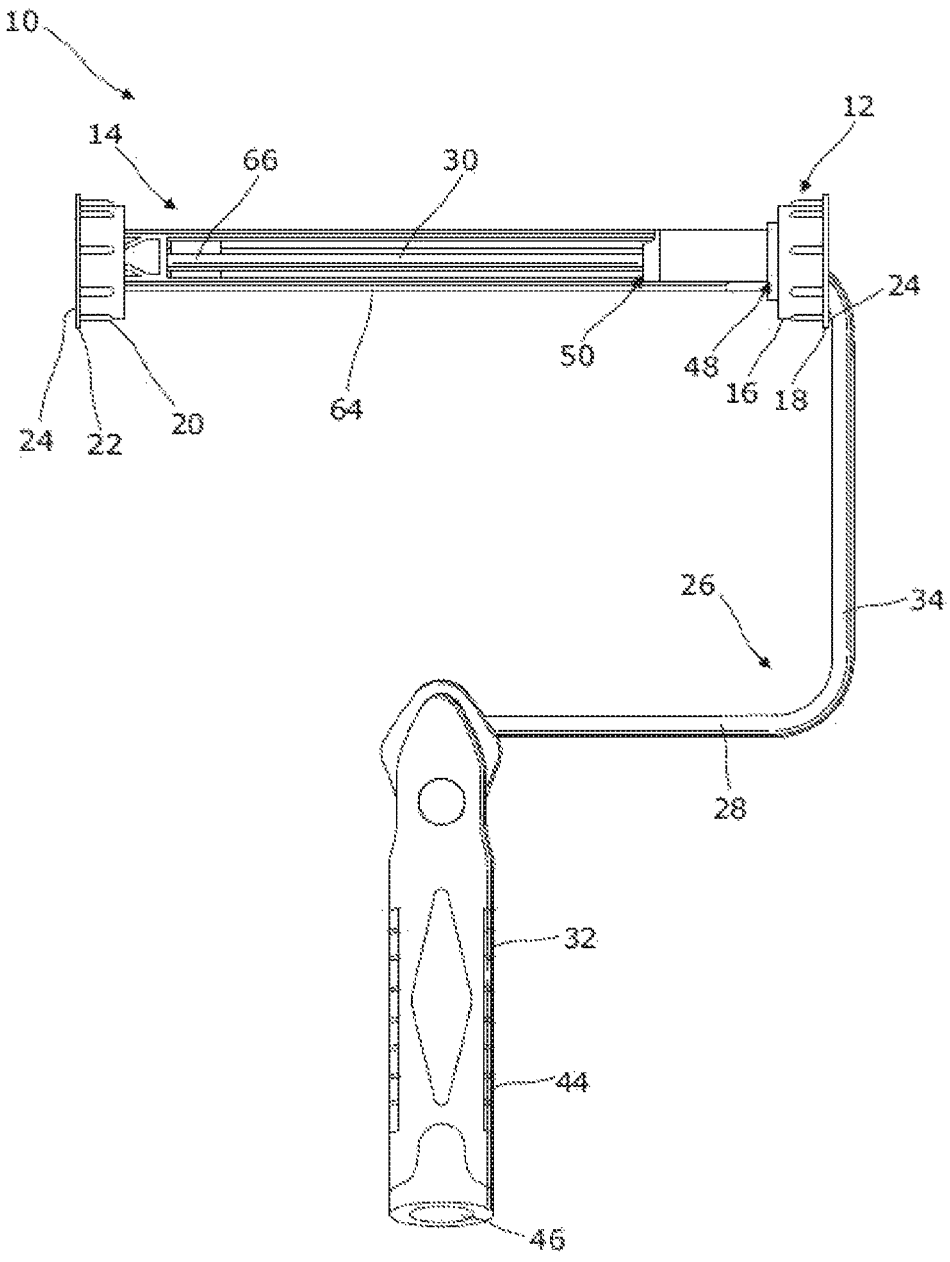
FIG. 1 shows a retention assembly according to a first embodiment of the invention.
Figure 3A:
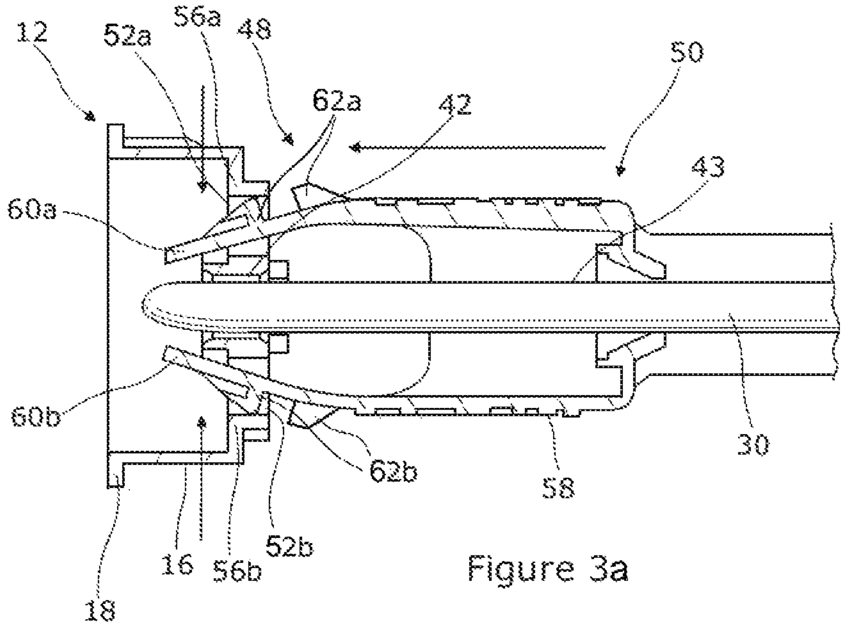

FIG. 3*a* shows mutually engageable attachment formations which form a part of the retention assembly shown in FIG. 1

Figure 3B:
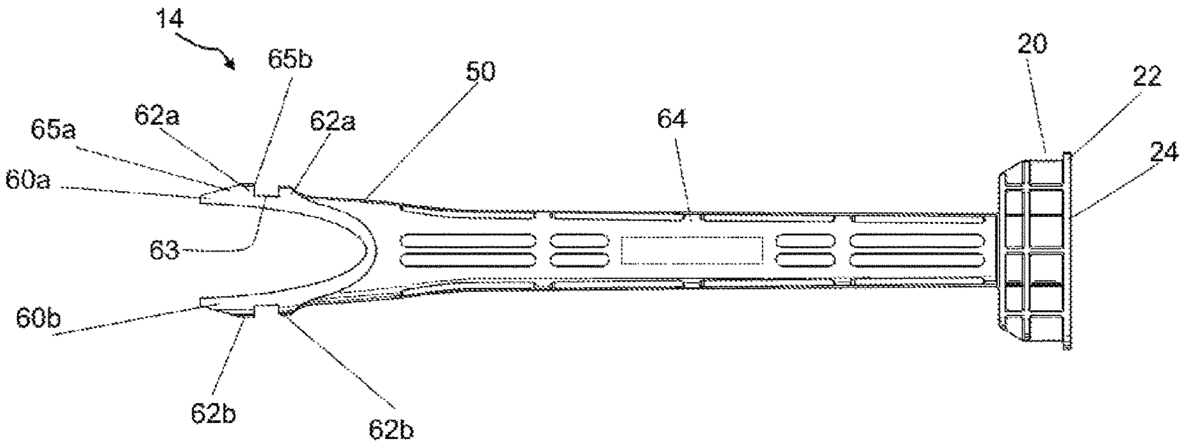
Figure 4:
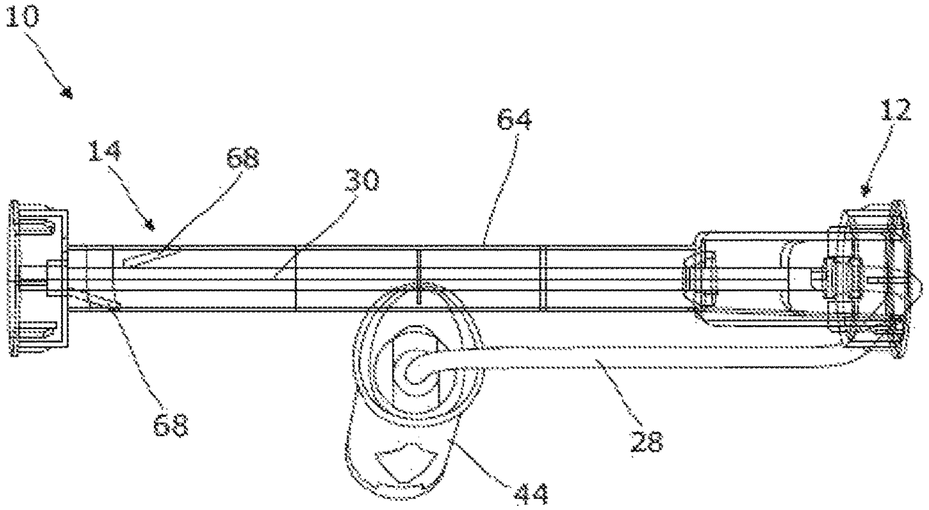
Figure 5:
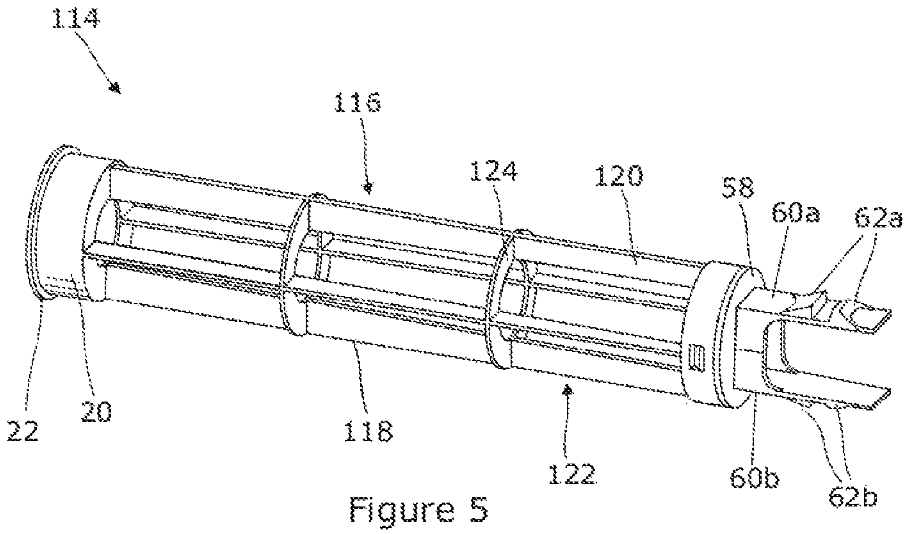
Figure 6:
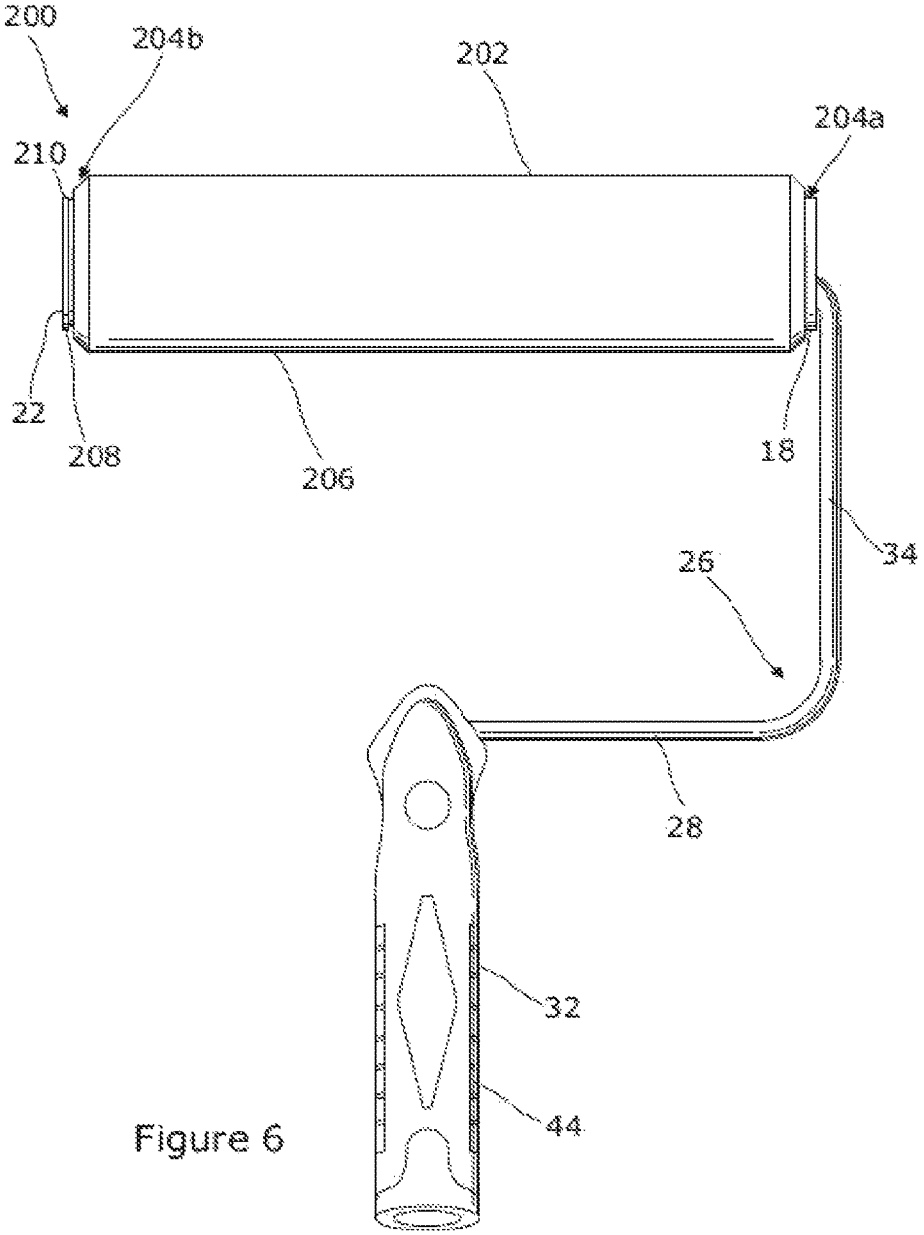

FIG. 3*b* shows a separable mount member which forms part of the retention assembly shown in FIG. 1;

FIG. 4 shows a further view of the retention assembly shown in FIG. 1;

FIG. 5 shows a second separable mount member which forms a part of a retention assembly according to a second embodiment of the invention; and FIG. 6 shows a decorating roller assembly according to a third embodiment of the invention.

A retention assembly according to a first embodiment of the invention is designated generally by the reference numeral 10 and is shown in FIG. 1.

The retention assembly 10 includes a fixed mount member 12 and a separable mount member 14.

The fixed mount member 12 has a first primary support formation 16 and a first retention formation 18 that extends radially beyond the first primary support formation 16.

The separable mount member 14 is selectively couplable with the fixed mount member 12, and it has a second primary support formation 20 and a second retention formation 22 that extends radially beyond the second primary support formation 20.

In the embodiment shown, each of the first and second retention formations 18, 22 is a single projection portion 24 that extends fully around its corresponding primary support formation 16, 20. Each single projection portion 24 is integrally formed with its corresponding primary support formation 16, 20. The single projection portion 24 may, in other embodiments of the invention, instead extend only part-way around its corresponding primary support formation 16, 20. The single projection 24 may also be separately formed from but secured to its corresponding primary support formation 16, 20.

In other embodiments of the invention (not shown) one or both of the first and second retention formation 18, 22 may be formed from a plurality of discrete projection portions. In further embodiments of the invention (not shown) one of the first or second retention formations 18, 22 may be formed from a plurality of discrete projection portions while the other one of the first or second retention formations 18, 22 may be formed from a single projection portion 24.

As shown in FIG. 1, the fixed mount member 12 is fixedly secured to a roller frame 26.

In the embodiment shown, the roller frame 26 is formed from a single length of round bar 28. The roller frame 26 includes a mount portion 30, a handle portion 32 and a connection portion 34 lying between the mount portion 30 and the handle portion 32.

The mount portion 30 includes an abutment formation 36 against which the fixed mount member 12 abuts to prevent the fixed mount member 12 from moving along the mount portion 30 of the roller frame 26.

Figure 2:
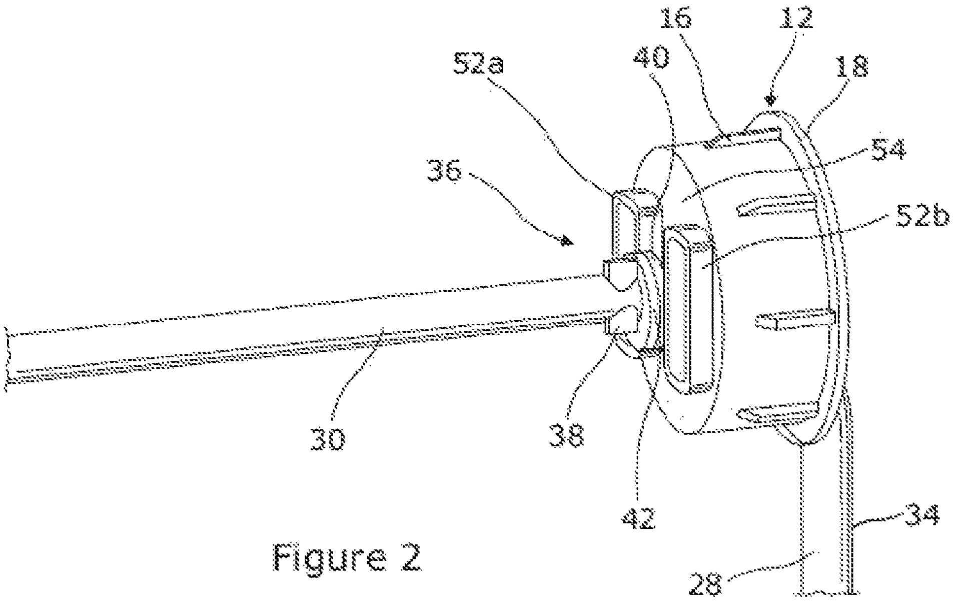
FIG. 2 shows a fixed mount member which forms a part of the retention assembly shown FIG. 1.

The abutment formation 36 is shown in more detail in FIG. 2. In this embodiment, the abutment formation 36 is a crimp 38 inserted through the wire 28 of the roller frame 26. The abutment formation 36 may take another form such as a spot of welded metal. The fixed mount member 12 abuts the crimp 38 via a washer 40 that lies between the crimp 38 and the fixed mount member 12. In other embodiments of the invention (not shown), the washer 40 may be omitted such that the fixed mount member 12 abuts the crimp 38 directly.

The fixed mount member 12 includes an aperture 42 which rotatably receives the bar 28 of the mount portion 30 of the roller frame 26 such that the fixed mount member 12 is rotatable relative to the roller frame 26. The separable mount member 14 also includes an aperture 43 to rotatably receive the bar 28 of the mount portion 30 of the roller frame 26 such that the separable mount member 14 is similarly rotatable relative to the roller frame 26. In the embodiment shown, the aperture 43 of the separable mount member 14 extends fully therethrough. The aperture 43 may instead extend part-way through the mount member 14 such that a cap (not shown) is formed at one end of the separable mount member 14. In such a further embodiment, the cap may abut an end of the bar 28 received in the aperture 43.

The fixed mount member 12 and/or the separable mount member 14 may include a bearing assembly to aid in the rotation of the fixed and/or separable mount members 12, 14 relative to the roller frame 26.

In other embodiments of the invention (not shown), the first and second retention formations 18, 22 may be fixed to the mount portion 30 of the roller frame 26, and the first and second primary support formations 16, 20 may be rotatable relative to the corresponding first or second retention formation 18, 22.

Returning to FIG. 1, the handle portion 32 of the roller frame 26 extends substantially perpendicularly to the mount portion 30 of the roller frame 26 and is spaced from the mount portion 30 by the connection portion 34.

Moreover, the handle portion 32 extends substantially perpendicularly opposite a midpoint of the mount portion 30. In other embodiments of the invention (not shown), the handle portion 32 may instead extend opposite a point offset from the midpoint of the mount portion 30.

The handle portion 32 includes a handle 44 secured thereto. The handle 44 may be secured to the handle portion 32 by, for example, a friction fit and/or by an adhesive. The handle 44, in this embodiment, includes an aperture 46 to in use receive an extension pole or other accessory.

Each of the first and second primary support formations 16, 20 includes a respective mutually engageable attachment formation 48, 50. As shown in FIG. 3, the first primary support formation 16 includes a receivable attachment formation 48 that receives a insertable attachment formation 50 of the second primary support formation 20.

Moreover, when the receivable attachment formation 48 receives the insertable attachment formation 50, the insertable attachment formation 50 lies wholly within the first primary support formation 16. In this way, when the fixed and separable mount members 12, 14 are coupled with one another, the insertable attachment formation 50 does not protrude beyond the extent of the first primary support formation 16.

In the embodiment of the invention shown in FIG. 3, the receivable attachment formation 48 includes first and second slots 52*a*, 52*b* formed within a face 54 of the first primary support formation 16. The slots 52*a*, 52*b* lie parallel with one another on opposite sides of the aperture 42 which receives the mount portion 30 of the roller frame 26.

The receivable attachment formation 48 further includes first and second stop portions 56*a*, 56*b*. The first and second stop portions 56*a*, 56*b* are formed from respective internal corners of each of the first and second slots 52*a*, 52*b*.

Meanwhile, the insertable attachment formation 50 includes an attachment body 58 and first and second attachment legs 60*a*, 60*b* that extend laterally from the attachment body 58.

Each of the first and second attachment legs 60*a*, 60*b* are resiliently deformable, as shown in FIG. 3, and each includes a respective pair of barb portions 62*a*, 62*b* spaced from one another to form a gap 63 therebetween. The first and second pairs of barb portions 62*a*, 62*b* cooperate with a corresponding first or second stop portion 56*a*, 56*b*, when the receivable attachment formation 48 fully receives the insertable attachment formation, so as to resist separation of the insertable attachment formation 50 from the receivable attachment formation 48.

In particular, the first and second attachment legs 60*a*, 60*b* deform towards one another to allow each of the legs 60*a*, 60*b* to enter one of the slots 52*a*, 52*b*, and to allow the stop portions 56*a*, 56*b* to locate in the gap 63 formed between a respective pair of barb portions 62*a*, 62*b*.

In other embodiments of the invention, it may be a portion of the receivable attachment formation 48 other than the stop portions 56*a*, 56*b* that is located between the barb portions 62*a*, 62*b*. For example, there may be another protruding portion formed on an inner surface of the receivable attachment formation 48 which locates in the gap 63 formed between the pairs of barb portions 62*a*, 62*b*.

An example of the insertable attachment formation 50 is shown in more detail in FIG. 3*b*. Each of the barb portions 62*a*, 62*b* includes a tapered end 65*a* and a non-tapered end 65*b*. The non-tapered end 65*b* is the end that extends from the attachment body 58 by the most, i.e. the tallest section of the barb portion 62*a*, 62*b*. The non-tapered end 65*b* slopes downwards towards the tapered end 65*a*. The barb portions 62*a*, 62*b* are positioned so that the non-tapered ends 65*b* face each other. Thus, the gap 63 is created between the non-tapered ends 65*a*, 65*b* with the non-tapered ends 65*a*, 65*b* defining the walls of the gap 63.

In the embodiment shown, the non-tapered end 65*b* of each barb portion 62*a*, 62*b* extends vertically from the attachment body 58 so as to form a straight edge (thus, the walls of the gap 63 have a straight edge). In other embodiments, the non-tapered end 65*b* may extend at an angle so as to form an angled edge.

In the embodiment shown, the barb portions in each pair of barb portions 62*a*, 62*b* are not identical. In particular, the tapered portion 65*a* of the barb portion 62*a*, 62*b* closest to the legs 60*a*, 60*b* of the insertable attachment member 50 is longer than the tapered portion 65*a* of the opposing barb portion 62*a*, 62*b*. In other embodiments, the barb portions 62*a*, 62*b* in each pair may be identical.

In other embodiments, the barb portion 62*a*, 62*b* that is located away from the legs 60*a*, 60*b* may not include a tapered portion at all.

The insertable attachment formation 50 includes an elongate connection body 64. The elongate connection body 64 connects the second primary support formation 20 to the attachment body 58 and it includes a cavity 66 to rotatably receive the mount portion 30 of the roller frame 26, as shown in FIG. 4. The elongate connection body 64 may house, e.g. within the aforementioned cavity 66 thereof, a bearing assembly so as to aid in the rotation of the separable mount member 14 relative to the mount portion 30 of the roller frame 26.

In the embodiment shown, the second primary support formation 20, the elongate connection body 64, the attachment body 58 and the first and second attachment legs 60*a*, 60*b* are all integrally formed with one another. In other embodiments of the invention (not shown) one or more of the aforementioned features may be separately formed from the others.

In the foregoing manner, the first primary support formation 16 includes a receivable attachment formation 48 (i.e. first and second slots 52*a*, 52*b* and corresponding stop portions 56*a*, 56*b*), and the second primary support formation 20 includes an insertable attachment formation 50 (i.e. the first and second attachment legs 60*a*, 60*b* and corresponding pairs of barb portions 62*a*, 62*b*), the receivable attachment formation 48 selectively receiving the insertable attachment formation 50 to selectively secure the attachment formations 48, 50 to one another.

In other embodiments of the invention (not shown), the first primary support formation 16 may instead include first and second attachment legs 60*a*, 60*b*, and the second primary support formation 20 may include first and second slots 52*a*, 52*b* formed on a face of the second primary support formation 20. In further still embodiments of the invention (not shown), the first primary support formation 16 may include an elongate connection body 64 with first and second attachment legs 60*a*, 60*b* extending therefrom.

As shown in FIG. 4, the elongate connection body 64 includes two guide portions 68. Each of the guide portions 68 extends from the cavity 66 at an angle less than 90° relative to the cavity 66. In this embodiment, the guide portions 68 are staggered along the length of the elongate connection body 64. In other embodiments of the invention (not shown), the elongate connection body 64 may include fewer or more guide portions 68.

FIG. 5 shows a second separable mount member 114 according to another embodiment of the invention. The second separable mount member 114 includes similar features to the first separable mount member 14 shown in FIGS. 1, 3 and 4, and like features share the same reference numerals. The second separable mount member 114 differs from the first in that it additionally includes a secondary support formation 116.

The secondary support formation 116 extends laterally from the second primary support formation 20 and lies between the second primary support formation 20 and the attachment body 58 to form an elongate insertable attachment formation 118

The secondary support formation 116 includes a plurality of secondary support formation portions 120 that define a secondary support frame 122. The secondary support frame 122 includes two structural support formations 124, each of which joins the plurality of secondary support formation portions 120 to one another. The structural support formations 124 are also staggered along the length of the secondary support frame 122. The secondary support frame 122 may include fewer than or more than two structural support formations 124.

The fixed and separable mount members 12, 14 are made from a plastic, for example polypropylene. Meanwhile the roller frame 26 is made from zinc plated steel. The roller frame 26 may instead be made from stainless steel or aluminium (e.g. grade 6061). Meanwhile the washer 40 is made from nylon. Other materials may however be used for these elements.

A decorating roller assembly according to a third embodiment of the invention is designated generally by the reference numeral 200 and is shown in FIG. 6.

The decorating roller assembly 200 includes a retention assembly 10 described hereinabove and as shown in FIGS. 1 to 5. The decorating roller assembly 200 further includes a hollow tubular decorating roller 202 which has first and second ends 204*a*, 204*b*. The first end 204*a* receives the first primary support formation 16 while the second end 204*b* receives the second primary support formation 20.

The hollow tubular decorating roller 202 includes a decorating sleeve 206 which extends around a roller cartridge 208. The decorating sleeve 206 is made from a knitted polyester, although other materials may also possible such as a woven acrylic material.

The roller cartridge 208 has an internal cavity 210 within which the first and second primary support formations 16, 20 are received. The first and second retention formations 18, 22 extend radially beyond the internal cavity 210.

It will be understood that the hollow tubular decorating roller 202 is a standard component. Typically, the hollow tubular decorating roller 202, and more particularly its roller cartridge 208, is made in one of three possible diameters, namely 1.5" (approximately 38 mm), 1.75" (approximately 44 mm) and 2.25" (approximately 57 mm). Other diameters are however also be possible. The hollow tubular decorating roller 202 is also typically 4" (approximately 100 mm) or 9" (approximately 220 mm) long. However, other lengths of the hollow tubular decorating roller 202 are also possible, such as 2" (approximately 50 mm), 7" (approximately 180 mm), 10" (approximately 250 mm) or 12" (approximately 305 mm).

Prior to use of the retention assembly 10 of the invention for decorating purposes, the handle portion 32 of the roller frame 26 is inserted into the washer 40 and the aperture 42 of the fixed mount member 12. The washer 40 and the fixed mount member 12 are then slid along the handle and connection portion 32, 34 of the roller frame 26 and towards the mount portion 30 of the roller frame 26.

The washer 40 abuts the crimp 38 and lies between the crimp 38 and the face 54 of the first primary support formation 16. The fixed mount member 12 is positioned between the crimp 38 and the junction at which the connection portion 34 meets the mount portion 30 of the roller frame 26.

The handle portion 32 of the roller frame 26 is then inserted into the aperture 46 of the handle 44 so as to secure the handle 44 to the roller frame 26. The additional step of applying an adhesive to the handle 44 may be taken.

The aforementioned steps are typically carried out during manufacturer of the retention assembly 10, however they may be carried out by a user of the retention assembly 10.

In readiness for using the retention assembly 10 for decorating purposes, the separable mount member 14 is separated from the fixed mount member 12 and inserted into the roller cartridge 208 of a hollow tubular decorating roller 202 such that the second primary support formation 20 is received by the second end 204*b* of the hollow tubular decorating roller 202. Meanwhile, the first and second attachment legs 60*a*, 60*b* of the insertable attachment formation 50 lie within the first end 204*a* of the hollow tubular decorating roller 202.

The insertable attachment formation 50 extends along the length of the hollow tubular decorating roller 202. If the second separable mount member 114 (i.e. as shown in FIG. 5) is used instead, then the secondary support formation 116 internally abuts the roller cartridge 208.

The separable mount member 14 is then secured to the fixed mount member 12 via the receivable and insertable attachment formations 48, 50 so as to retain the hollow tubular decorating roller 202 between the fixed and separable mount members 12, 14.

More specifically, the mount portion 30 of the roller frame 26 is inserted into the cavity 66 of the elongate connection body 64, and the separable mount member 14 is slid along the mount portion 30 of the roller frame 26 towards the fixed mount member 12.

When sliding the separable mount member 14 along the mount portion 30 of the roller frame 26, the guide portions 68 act to guide the mount portion 30 along the length of the elongate connection body 64 so as to centralise the mount portion 30 of the roller frame 26 within the elongate connection body 64.

The first and second attachment legs 60*a*, 60*b* are then deformed towards one another so that they enter into a corresponding first or second slot 52*a*, 52*b* of the receivable attachment formation 48. Once entered, the separable mount member 14 is pushed further towards the fixed mount member 12 so that the stop portions 56*a*, 56*b* locate in the gap 63 formed between each pair of barb portions 62*a*, 62*b*, thereby allowing the first and second attachment legs 60*a*, 60*b* to return to their undeformed, i.e. relaxed, state. In the relaxed state, the non-tapered ends 65*b* of each pair of barb portions 62*a*, 62*b* abut against either side of a respective stop portion 56*a*, 56*b* so as to secure the separable mount member 14 to the fixed mount member 12.

A user is then able to load the decorating sleeve 206 with paint and apply the paint to a surface, e.g. a wall, by rolling the hollow tubular roller 202 over the surface without the hollow tubular roller 202 coming away from the roller frame 26.

To remove the hollow tubular roller 202 from the roller frame 26, the first and second attachment legs 60*a*, 60*b* are again deformed towards one another so as to release the barb portions 62*a*, 62*b* from the respective stop portion 56*a*, 56*b*. The separable mount member 14 is then pulled away from the fixed mount member 12 along the mount portion 30 of the roller frame 26.

The hollow tubular roller 202 can then be removed from the separable mount member 14 by sliding the hollow tubular roller 202 along the elongate connection body 64 and away from the second primary support formation 20. The hollow tubular roller 202 can then be replaced or cleaned as desired.

The invention claimed is:

1. A retention assembly for a hollow tubular decorating roller comprising:

a fixed mount member securable in use to a roller frame and including a first primary support formation and a first retention formation extending radially beyond the first primary support formation; and a separable mount member selectively couplable with the fixed mount member, the separable mount member including a second primary support formation and a second retention formation extending radially beyond the second primary support formation, the first and second primary support formations being received, in use, by a respective end of a hollow tubular decorating roller, the first and second retention formations cooperating with one another while the separable mount member is coupled with the fixed mount member to in use retain a hollow tubular decorating roller therebetween, wherein each of the first and second primary support formations includes a respective mutually engageable attachment formation, one of the mutually engageable attachment formations is a receivable attachment formation and the other one of the mutually engageable attachment formations is an insertable attachment formation, the receivable attachment formation includes an opening and the insertable attachment formation incudes an inserting portion for inserting into the opening of the receivable attachment formation, the insertable attachment formation further including a locking member configured to cooperate with the receivable attachment formation when the inserting portion is inserted into the opening to couple the receivable and insertable attachment formations to one another, wherein the locking member includes first and second locking member portions protruding from the insertable attachment formation and being spaced from one another to locate a portion of the receivable attachment formation therebetween, wherein;

the first and second looking member portions each take the form of a barb portion, each barb portion having a tapered end and a non-tapered end, the non-tapered end of each barb portion facing one another, and the first and second barb portions locate at either side of the opening of the receivable attachment formation.

2. A retention assembly according to claim 1 wherein at least one of the mutually engageable attachment formations is a resiliently deformable attachment formation.

3. A retention assembly according to claim 1 wherein one of the mutually engageable attachment formations is elongate so as to extend, in use, along the length of a hollow tubular decorating roller.

4. A retention assembly according to claim 1 wherein the receivable attachment formation includes first and second slots formed on an outer face of the corresponding mutually engageable attachment formation, and further includes first and second stop portions formed within the receivable attachment formation, and wherein the insertable attachment formation includes first and second resiliently deformable attachment legs each having first and second locking member portions spaced from one another, the first and second attachment legs being configured to deform, in use, towards one another to selectively permit entry and exit of the legs into and out of a respective slot, and wherein the first and second locking member portions of each first and second attachment legs are configured to locate a corresponding stop portion between the first and second locking member portions to resist separation of the mutually engageable attachment formations.

5. A retention assembly according to claim 1 wherein at least one of the first and second retention formations includes a plurality of discrete projection portions.

6. A retention assembly according to claim 1 wherein at least one of the first and second retention formations includes a single projection portion extending fully around the corresponding primary support formation.

7. A retention assembly according to claim 1 wherein the fixed mount member includes a roller frame fixedly secured thereto.

8. A retention assembly according to claim 7 wherein the separable mount member includes a guide portion to guide the position of the roller frame relative to the separable mount member.

9. A retention assembly according to claim 1 wherein at least one of the fixed and separable mount members includes a secondary support formation to in use support an interior of a hollow tubular decorating roller.

10. A decorating roller assembly comprising:

a retention assembly for a hollow tubular decorating roller comprising:

a fixed mount member securable in use to a roller frame and including a first primary support formation and a first retention formation extending radially beyond the first primary support formation; and a separable mount member selectively couplable with the fixed mount member, the separable mount member including a second primary support formation and a second retention formation extending radially beyond the second primary support formation, the first and second primary support formations being received, in use, by a respective end of a hollow tubular decorating roller, the first and second retention formations cooperating with one another while the separable mount member is coupled with the fixed mount member to in use retain a hollow tubular decorating roller therebetween, wherein each of the first and second primary support formations includes a respective mutually engageable attachment formation, one of the mutually engageable attachment formations is a receivable attachment formation and the other one of mutually engageable attachment formations is an insertable attachment formation, the receivable attachment formation includes an opening and the insertable attachment formation incudes an inserting portion for inserting into the opening of the receivable attachment formation, the insertable attachment formation further including a locking member configured to cooperate with the receivable attachment formation when the inserting portion is inserted into the opening to couple the receivable and insertable attachment formations to one another, wherein the locking member includes first and second locking member portions protruding from the insertable attachment formation and being spaced from one another to locate a portion of the receivable attachment formation therebetween, wherein:

the first and second locking member portions each take the form of a barb portion, each barb portion having a tapered end and a non-tapered end, the non-tapered end of each barb portion facing one another, and the first and second barb portions locate at either side of the opening of the receivable attachment formation; and a hollow tubular decorating roller within respective ends of which is received a corresponding first or second primary support formation of the retention assembly.

11. A decorating roller assembly according to claim 10 wherein each of the first and second retention formations extends radially beyond an internal cavity of the hollow tubular decorating roller.

12. A decorating roller assembly according to claim 10, wherein at least one of the mutually engageable attachment formations is a resiliently deformable attachment formation.

13. A decorating roller assembly according to claim 10, wherein one of the mutually engageable attachment formations is elongate so as to extend, in use, along the length of a hollow tubular decorating roller.

14. A decorating roller assembly according to claim 10, wherein the receivable attachment formation includes first and second slots formed on an outer face of the corresponding mutually engageable attachment formation, and further includes first and second stop portions formed within the receivable attachment formation, and wherein the insertable attachment formation includes first and second resiliently deformable attachment legs each having first and second locking member portions spaced from one another, the first and second attachment legs being configured to deform, in use, towards one another to selectively permit entry and exit of the legs into and out of a respective slot, and wherein the first and second locking member portions of each first and second attachment legs are configured to locate a corresponding stop portion between the first and second locking member portions to resist separation of the mutually engageable attachment formations.

15. A decorating roller assembly according to claim 10, wherein at least one of the first and second retention formations includes a plurality of discrete projection portions.

16. A decorating roller assembly according to claim 10, wherein at least one of the first and second retention formations includes a single projection portion extending fully around the corresponding primary support formation.

17. A decorating roller assembly according to claim 10, wherein the fixed mount member includes a roller frame fixedly secured thereto.

18. A decorating roller assembly according to claim 17, wherein the separable mount member includes a guide portion to guide the position of the roller frame relative to the separable mount member.

19. A decorating roller assembly according to claim 10, wherein at least one of the fixed and separable mount members includes a secondary support formation to in use support an interior of a hollow tubular decorating roller.

* * * * *